US008200550B2

(12) United States Patent
Aitkins (10) Patent No.: US 8,200,550 B2
(45) Date of Patent: Jun. 12, 2012

(54) SYSTEMS AND METHODS FOR PROVIDING REMOTE ORDERING (76) Inventor: Steve Aitkins, San Francisco, CA (US)

(*) Notice: Subject to any disclaimer, the term of this patent is extended or adjusted under 35 U.S.C. 154(b) by 0 days.

(21) Appl. No.: 11/749,125

(22) Filed: May 15, 2007

(65) Prior Publication Data

US 2007/0265937 A1    Nov. 15, 2007

Related U.S. Application Data (60) Provisional application No. 60/747,232, filed on May 15, 2006.

(51) Int. Cl.
G06Q 30/00    (2006.01)

(52) U.S. Cl. ... 705/26.81; 705/15; 705/26.1; 705/26.61; 705/26.8

(58) Field of Classification Search .......... 705/1, 26–27, 705/15, 26.1–27.2
See application file for complete search history.

(56) References Cited

U.S. PATENT DOCUMENTS

| | | | | |
|---|---|---|---|---|
| 5,991,739 | A * | 11/1999 | Cupps et al. | 705/26 |
| 6,681,109 | B1 * | 1/2004 | Leifer | 455/414.1 |
| 6,748,364 | B1 * | 6/2004 | Waytena et al. | 705/5 |
| 7,209,903 | B1 * | 4/2007 | Mamdani et al. | 705/75 |
| 2001/0049636 | A1 * | 12/2001 | Hudda et al. | 705/26 |
| 2002/0003867 | A1 * | 1/2002 | Rothschild et al. | 379/88.01 |
| 2002/0016747 | A1 * | 2/2002 | Razumov | 705/26 |
| 2002/0038259 | A1 * | 3/2002 | Bergman et al. | 705/26 |
| 2002/0049644 | A1 * | 4/2002 | Kargman | 705/26 |
| 2002/0059111 | A1 * | 5/2002 | Ding et al. | 705/26 |
| 2002/0138350 | A1 * | 9/2002 | Cogen | 705/15 |
| 2002/0143638 | A1 * | 10/2002 | August et al. | 705/26 |
| 2002/0143655 | A1 * | 10/2002 | Elston et al. | 705/26 |
| 2003/0014330 | A1 * | 1/2003 | Showghi et al. | 705/26 |
| 2003/0110097 | A1 * | 6/2003 | Lei | 705/27 |
| 2003/0208409 | A1 * | 11/2003 | Mault | 705/26 |
| 2005/0015301 | A1 * | 1/2005 | Johnson | 705/15 |
| 2006/0178943 | A1 * | 8/2006 | Rollinson et al. | 705/26 |

OTHER PUBLICATIONS www.mobile-menus.com. Apr. 10, 2004. Recovered from www.Archive.org.*
Unknown Author, Starbucks Tests Express Ordering System, NACS Online, (www.nacsonline.com), Aug. 2, 2002.
Christina Brickley, "Starbucks Express" Launches in Denver—Innovative Ordering System . . . , Business Wire (www.foodservice.com), Aug. 1, 2002.

* cited by examiner

Primary Examiner — Will Allen
(74) Attorney, Agent, or Firm — Dylan O. Adams (57) ABSTRACT This invention provides systems and methods for remote ordering where there is a client that is configurable to accept orders; an information processing system, that is in communication with the client and configurable to receive orders from the client; a plurality of wireless modules in disparate physical locations that are in wireless communication with the information processing system and configurable to receive orders from the information processing system; and an order presentation client that is in communication with the wireless module and configurable to present the order. Furthermore, the information processing system is configurable to route the orders to a selected wireless module based on the order.

19 Claims, 6 Drawing Sheets

SYSTEMS AND METHODS FOR PROVIDING REMOTE ORDERING

PRIORITY CLAIM

This application claims priority to U.S. Provisional Application 60/747,232 filed May 15, 2006. The foregoing application is hereby incorporated by reference in its entirety as if fully set forth herein.

FIELD OF THE INVENTION

This invention relates generally to ordering, and more specifically, to systems and methods for providing remote ordering of goods or services.

BACKGROUND OF THE INVENTION

Before advances in modern communication, customers who sought to purchase goods or services had to travel to meet personally with vendors to place an order. Furthermore, if such orders could not be filled immediately, the customer may have been required to return to the vendor to receive the filled order.

The advent and advancement of the mail system, the telephone, and the internet, however, has made the process of order placement and receipt much more efficient. For example, the mail system and internet allows customers to become more easily aware of goods and services and make it easier to subsequently purchase them. More specifically, a potential customer might receive a catalog or other listing of goods and services from a vendor in the mail or over the internet and would then subsequently use the mail, telephone, or internet to place an order with the vendor. Although this increases efficiency of ordering, customers may still not have access to the most current prices, specials, and availability of the goods and services they want to order. Additionally, customers that require goods and services from multiple vendors must keep track of multiple catalogues or menus, which is highly cumbersome.

Along with increased efficiency due to catalogs and menus, the time it takes to place an order has become more efficient. Instead of having to speak personally with a vendor, the mail, telephone and internet allow orders to travel to vendors relatively quickly. Despite increased efficiency, however, these methods of placing orders are nonetheless deficient because they still require a long time to effectuate. Calling for goods and services is one of the most popular and fastest methods of ordering, but it is still slow and inefficient because the vendor may be busy or away from the telephone and unable to receive the telephone call. Moreover, the clarity of phone conversations can be poor, miscommunications commonly occur, and errors commonly occur when orders need to be written down by the vendor in addition to being orally dictated by the customer. Most importantly, customers who seek goods from multiple vendors are required to store, look-up and dial a multitude of telephone numbers and take the time to place each order, while also having to memorize or store multiple menus or catalogs of goods and services.

The internet solves some of these problems associated with the efficiency of placing orders, yet is still quite deficient. Although orders can be made quickly and with greater accuracy than telephone orders, a customer must nonetheless visit multiple internet sites to purchase goods or services, and not all vendors have internet ordering available. This is most true with the ordering of food and drinks, which is rarely available over the internet.

A customer who is on the go and requires goods and services quickly, such as food or drinks for example, will have difficulty handling all the information required to place an order at a specific location especially when the customer uses multiple communication means to place orders. One vendor may have multiple, physical locations along with multiple websites, telephone numbers, fax numbers, and cell phone numbers, which would require a potential customer to know all these numbers or addresses. When multiple vendors are involved, there can be hundreds of pieces of data that need to be managed, which can make ordering goods and services very difficult.

Finally, another problem with the current state of ordering is that efficiency does not always increase when a customer frequently places the same order or a small variety of orders. Here, the customer must nonetheless take the same amount of time place what might be the same order day after day. This is common for orders such for food or coffee, which are usually regular and repetitive in nature.

The present state of ordering goods and services lacks efficiency, especially for repetitive orders, when a customer utilizes multiple vendors or locations, and when a user needs to use multiple forms of communication. Therefore, what is needed are systems and methods for remote ordering.

SUMMARY OF THE INVENTION

This invention relates generally to ordering, and more specifically, to systems and methods for providing remote ordering of goods or services. In one embodiment, the invention provides systems and methods for remote ordering where there is a client that is configurable to accept orders; an information processing system that is in communication with the client and configurable to receive orders from the client; a plurality of wireless modules in disparate physical locations that are in wireless communication with the information processing system and configurable to receive orders from the information processing system; and an order presentation client that is in communication with the wireless module and configurable to present the order. Furthermore, the information processing system is configurable to route the orders to a selected wireless module based on the order.

In further embodiments the client is an IVR system, SMS gateway, or internet client and the order presentation device is a printer. In still further embodiments the order processing system includes an order database, a wireless database, order processing software, or a credit card gateway.

BRIEF DESCRIPTION OF THE DRAWINGS

Embodiments of the present invention are described in detail below with reference to the following drawings.

DETAILED DESCRIPTION

This invention relates generally to ordering, and more specifically, to systems and methods for providing remote ordering of goods or services. Specific details of certain embodiments of the invention are set forth in the following description and in FIGS. 1-6 to provide a thorough understanding of such embodiments. The present invention may have additional embodiments, or may be practiced without one or more of the details described for any particular described embodiment.

As described herein, a first element is defined as being in communication or communicating with a second element when information of any form can be transferred from the first element to the second element, when information of any form can be transferred from the second element to the first element or when information of any form can be transferred from the second element to the first element and when information of any form can be transferred from the first element to the second element. As described herein, information can be transferred between elements that are in communication by any means known or unknown, which includes, but is not limited to a telephone network, a wireless network, a wi-fi or wide fidelity network, a satellite network, a local area network, the internet, FTP, light, facsimile, verbal, radio, or methods of physical transfer such as the mails. Communication can also encompasses terms such as send, receive, transfer, upload, and download. Communication as described herein can be either direct or indirect.

Figure 1:
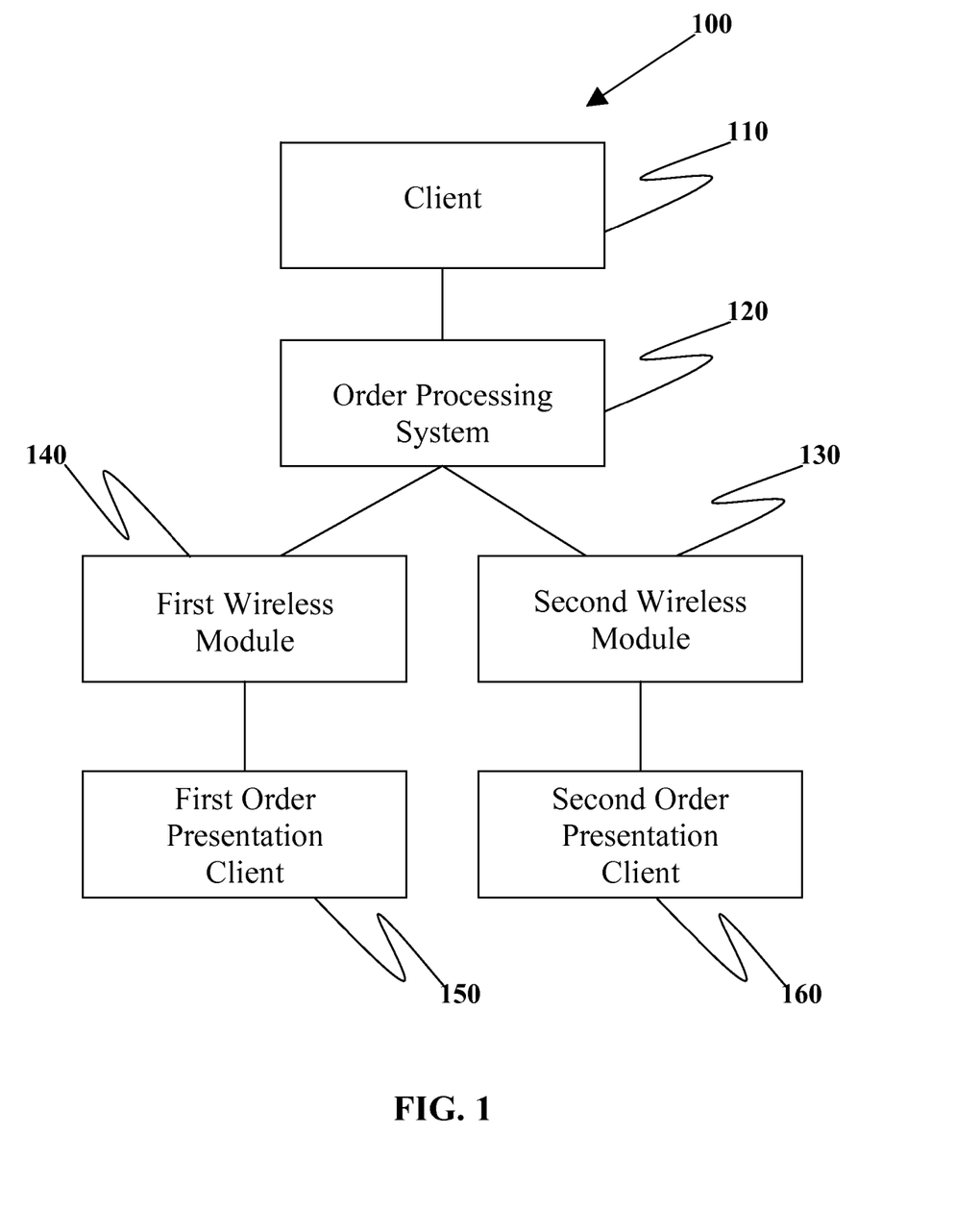
FIG. 1 is a block diagram of an exemplary system for providing remote ordering, in accordance with an embodiment of the invention.

FIG. 1 is a block diagram of an exemplary system for providing remote ordering 100, in accordance with an embodiment of the invention. This figure illustrates a system for providing remote ordering 100 comprising a client 110, which interacts with an order processing system 120, which interacts with a first wireless module 140, which interacts with a first order presentation client 150. The order processing system 120 also interacts with a second wireless module 130, which interacts with second order presentation client 160.

The client 110 can be any type of user interface that allows a user to initiate one or more order, such as a telephone, cellular telephone, satellite telephone, internet-enabled cellular telephone, computer, or personal data assistant. The client 110 creates one or more order and sends it to the order processing system 120.

In one embodiment of the present invention, the client 110 is a telephone, cellular telephone, satellite telephone, or any other telephone-like device, either known or unknown, which a user uses to initiate an order through an interactive voice recognition phone system. In a further embodiment, the client 110 is a cellular telephone, satellite telephone, personal data assistant, computer, or any other device that allows a user to create or sent text or numerically based messages or e-mail, which a user uses to initiate an order through a tone, text message, instant message, SMS text message, e-mail or any other text, numerical message, or audio communication.

In a still further embodiment, the client 110 is a computer, cellular telephone, satellite telephone, personal data assistant, or any other that device that allows a user access the internet, which a user uses to initiate an order through an internet based user interface, graphical user interface, or WAP-WML site. In a yet further embodiment, the client 110 is any device utilizing any means of communication such as a photon, radio wave, electron, microwave, or sound wave, which can be configured to communicate with an order processing system 120. In a still further embodiment, one or more type of client 110 can interact with the order processing system 120. The transmissions of data can be by wide fidelity (Wi-Fi), wireless personal network, or any other system and can use blue tooth or any other protocol. In a yet still further embodiment, two or more users can use one or more type of client 110 to initiate an order simultaneously or sequentially.

The client 110 interacts with the order processing system 120, which processes one or more order sent by the client 110. The order processing system 120 processes the one or more order sent by the client 110 and routes the order to either a first wireless module 140 or a second wireless module 130. If the order processing system 120 routes the one or more order to the first wireless module 140, then the first wireless module 140 communicates the one or more order to the first order presentation client 150, which presents the one ore more order. Alternatively, if the order processing system 120 routes the one or more order to the second wireless module 130, then the second wireless module 130 communicates the one or more order to the second order presentation client 160, which presents the one or more order.

The first order presentation client 150 and the second order presentation client 160 can be any device that is capable of displaying an order, such as a printer, screen, computer, cellular telephone, personal data assistant, or speaker. The order received by the first wireless module 140 or the second wireless module 130 can be transferred directly to a respective order presentation client 150, 160 or can be transmitted by wide fidelity (Wi-Fi), wireless personal network, local area network, satellite network, cellular network, or any other system and can use blue tooth or any other protocol.

In one embodiment the first wireless module 140 and the first order presentation client 150 are located in disparate location compared to the second wireless module 130 and the second order presentation client 160. For example, the first wireless module 140 and the first order presentation client 150 may be in a different room, building, block, street, city, state, or country compared to the second wireless module 130 and the second order presentation client 160. In a further embodiment there is a plurality of paired wireless modules and order presentation clients located in disparate locations.

Figure 2:
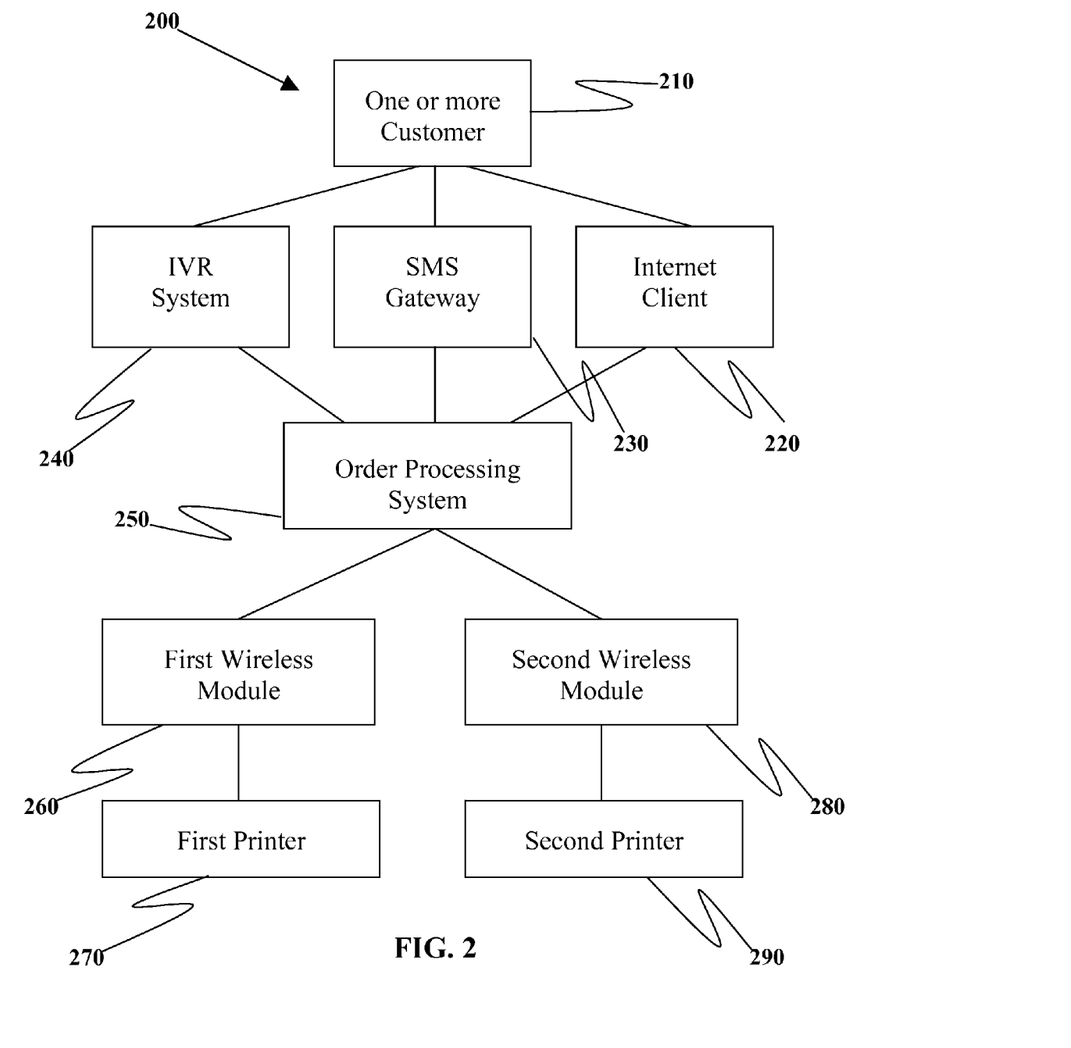
FIG. 2 is a block diagram of a further exemplary system for providing remote ordering, in accordance with an embodiment of the invention.

FIG. 2 is a block diagram of a further exemplary system for providing remote ordering 200, in accordance with an embodiment of the invention. The system for providing remote ordering 200 comprises one or more customer 210, who can initiate and create an order through either an interactive voice response (IVR system) system 240, a short message service (SMS) gateway 230, or an internet client 220. The system for providing remote ordering 200 further comprises an order processing system 250, which can be configured to receive, process, and route orders created or initiated by the IVR system 240, SMS gateway 230, or the internet client 220. The order processing system 250 can route and send an order to a first wireless module 260 or a second wireless module 280; the first wireless module 260 can communicate with a first printer 270 and the second wireless module 280 can communicate with a second printer 290.

In one embodiment, the order processing system 250 can comprise systems including, but not limited to, a wireless database, an order database, order processing software, and a credit card gateway. In a further embodiment, the one or more components of the order processing system may be located on one or more server and the one or more server may be located in one or more location.

The order processing system 250 routes and sends orders to the first wireless module 260 or the second wireless module

280. The order processing system 250 can use any type of wireless technology, either known or unknown, including, but not limited to, wide fidelity network (wi-fi), cellular network, satellite network, radio, or light and may use blue tooth or any other protocol. If the order processing system 250 routes and sends an order to the first wireless module 260, the first wireless module 260 communicates with the first printer 270, which prints the order. If the order processing system 250 routes and sends an order to the second wireless module 280, the second wireless module 280 communicates with the second printer 290, which prints the order.

In one embodiment the first printer 270 or the second printer 290 can be any type of printer, including, but not limited to, liquid inkjet, solid inkjet, dye-sublimation, impact, dot-matrix, line, thermal, or pen-based plotter. In a still further embodiment, the first printer 270 or the second printer 290 can print any color or texture and can print onto or in any medium, including paper, plastic, photographic film or punch card.

The one or more customer 210 can be any person or other entity located anywhere in the universe. In one embodiment of the intention the one or more customer 210 can use one or more of the group consisting of IVR system 240, the SMS gateway 230, or the internet client 220, either simultaneously or in any sequential order to initiate or create an order.

The IVR system 240 is a user interface that allows a user to use voice and/or tone input to create orders. In one embodiment the IVR system 240 allows a user on a telephone cellular telephone, satellite telephone, voice over IP device, or any other voice transmitting device or system to select order creation options from a voice menu and otherwise interface with the IVR 240. In one embodiment, the IVR system 240 presents a user with a first audio menu and the user can select an option from the menu by speaking a number, letter or phrase, which will prompt the IVR system 240 to present a second menu or to perform one or more order function. The IVR system 240 can comprise one or more audio menu and can perform one or more order function. In a further embodiment, a user can interface with the IVR system 240 using the keys, stylus, or buttons of a telephone, cellular telephone, satellite telephone, computer, personal data assistant or any other such device that facilitates data input.

The SMS gateway 230 allows a user to send and receive text messages to and from the order processing system 250 so as to facilitate the selection, purchase or ordering of one or more service or product. Any device that can send or receive text messages can be used as a client, including, but not limited to a telephone, cellular telephone, satellite telephone, personal data assistant or computer. In one embodiment a user can input one or more number, letter, or phrase to facilitate selection, purchase or ordering of one or more service or product. In a still further embodiment a user can receive a text message from one or more vendors. In a still further embodiment, a text message can be created from voice, manual input into a client, or by selection of a preset message.

The internet client 220 is any device that facilitates the transmission and/or receipt of data through the internet to the order processing system 250 including, but not limited to, a cellular telephone, satellite telephone, personal data assistant, or computer. In one embodiment the internet client presents a user with a graphical user interface that allows users to facilitate the selection, purchase or ordering of one or more service or product. In one embodiment of the invention, a user can select, purchase, or order one or more product or service using one or more method of inputting data, including, but not limited to a keyboard, mouse, trackball, stylus, touch screen, voice, or keypad.

In a still further embodiment, the IVR system 240, SMS gateway 230 or internet client 220, or any other type of client allows a user to execute one or more of the following actions: create a user account, log into a user account with a user name and password, select a method of payment, input a credit card for payment, select one or more vendor, select one or more service, select one or more product, select one or more favorite product, select one or more favorite service, create an order comprising one or more service and one or more product, create an order comprising one or more service or one or more product, send one or more order, cancel one or more order and save preferences or favorites. In a yet further embodiment, the IVR system 240, SMS gateway 230 or internet client 220, or any other type of client, further allows a user to execute any action that would facilitate the selection, purchase, or ordering of one or more service or product.

In another embodiment of the present invention, the IVR system 240, SMS gateway 230 or internet client 220, or any other type of client allows a customer to receive messages or alerts from vendors including but not limited to, special price alerts, updates of available products or services, updates of vendor hours of operation, updates of prices.

In a further embodiment, the IVR system 240, SMS gateway 230 or internet client 220, or any other type of client can be configured to facilitate a customer finding vendors that meet one or more criterion including, but not limited to type of service or product, price range of product or service, time required for vendor to fill orders, or distance from customers current location or other location.

In a yet further embodiment, the IVR system 240, SMS gateway 230 or internet client 220, or any other type of client allows a customer to select favorite preferences for services and products including, selecting and saving one or more favorite vendor, selecting one or more favorite product or service, selecting the order of display of favorite vendors, products or services.

Once a customer has initiated and created an order through the IVR system 240, SMS gateway 230 or internet client 220, or any other type of client, the order processing center 250 receives the order, processes the order, routes the order and sends the order to the first wireless module 260 or the second wireless module 280.

The first printer 270 or the second printer 290 can be directly connected to the first wireless module 260 or second wireless module 280 respectively through a connection such as a local area network, wireless network, or direct cable link. In one embodiment there can be one or more printer and the one or more printer can be any type of printer, including, but not limited to, liquid inkjet, solid inkjet, dye-sublimation, impact, dot-matrix, line, thermal, or pen-based plotter. In a still further embodiment, the printer can print with any color or texture and can print onto or in any medium, including paper, plastic, photographic film or punch card.

Figure 3:
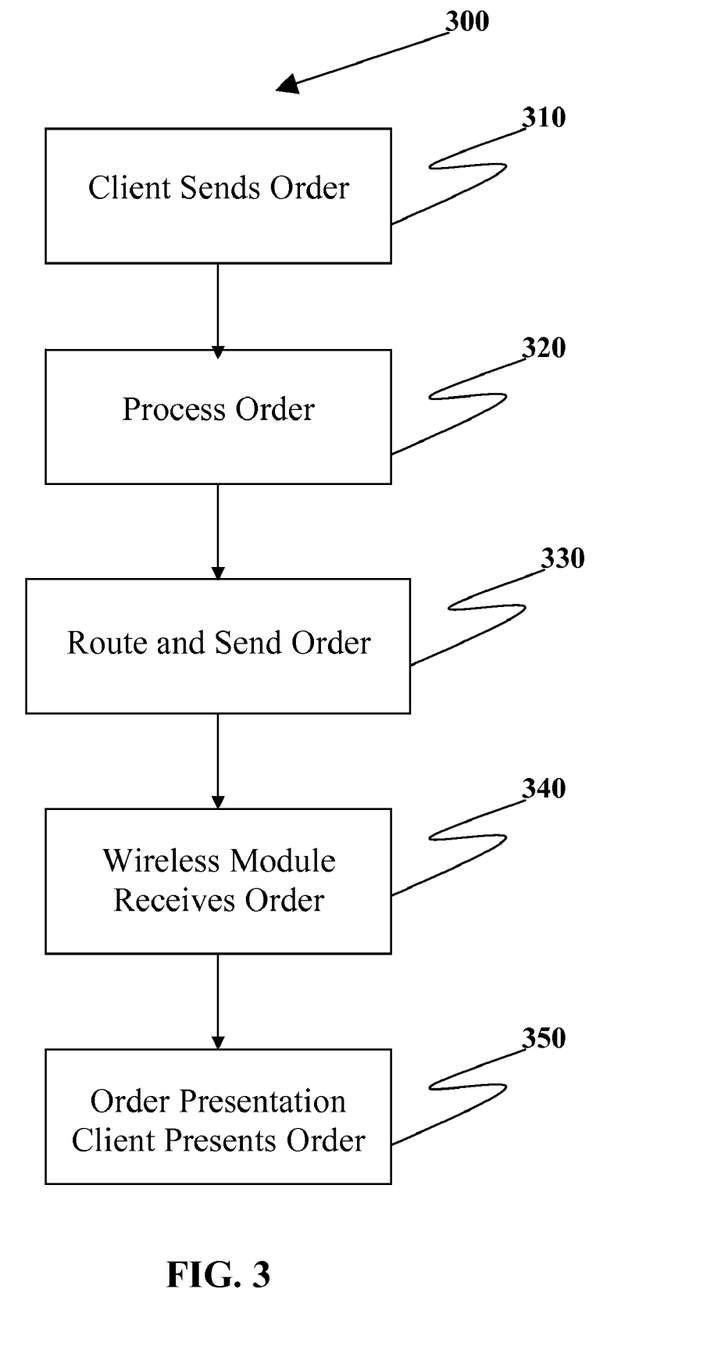
FIG. 3 is a block diagram of a method for providing remote ordering, in accordance with an embodiment of the invention.

FIG. 3 is block diagram of a method for providing remote ordering 300, in accordance with an embodiment of the invention. This method of providing remote ordering 300 illustrates a method comprising the steps: client sends order 310, process order 320, route and send order 330, wireless module receives order 340 and order presentation client presents order 350.

As discussed herein, the client can send an order 310 or send order data through any means of communication such as a wireless network, satellite network, SMS gateway, or telephone network. Once the order is received by the order processing system, the order is then processed 320, which can comprise steps including, but not limited to, data conversion, billing, assignment of routing information, creation of user history. In a further embodiment, processing may include any steps that facilitate creation of an order, routing of an order, communication of an order, billing, or record keeping. In a still further embodiment, processing can involve one or more systems that can comprise the order processing system, including, but not limited to, a wireless database, an order database, processing software, a wireless transmitter, or a wireless receiver.

In one embodiment of the present invention, there is a plurality of paired wireless modules and order presentation devices that are located in disparate locations. Furthermore when a customer initiates and creates an order, the customer selects a vendor that will fill the order that the customer creates, and this selection is included in the order when the client sends the order 310, and this selection is used to route and send the order 300 to an selected vendor and therefore one or more selected wireless module. For example, if a customer selects an order be filled by a vendor "Joe's Café," the order processing system will route and send the order 330 to the wireless module associate with, assigned to, or located at vendor "Joe's Café."

As described herein, an order is a digital, physical or other recordation or representation of a selection of one or more service or product by one or more customer. An order can comprise information, including, but not limited to, user name, password, billing information, vendor name, a selection of one or more service or product, product code, credit card authorization, customer order history, client type, client location, customer address, customer telephone number, customer e-mail address or customer IP address.

After the order is processed 320, it is routed and sent 330 to a remote wireless module and the remote wireless module receives the order 340. After the order is received by the wireless module 340, the order is then communicated to an order presentation client and the order presentation client presents the order 350. As described herein, the order presentation client may be any device that is capable of printing, displaying, playing or otherwise communicating, transmitting or documenting an order. The order presentation client, as described herein can be a device, including, but not limited to, a printer, television, monitor, computer, speaker, or other display or presentation device.

Figure 4:
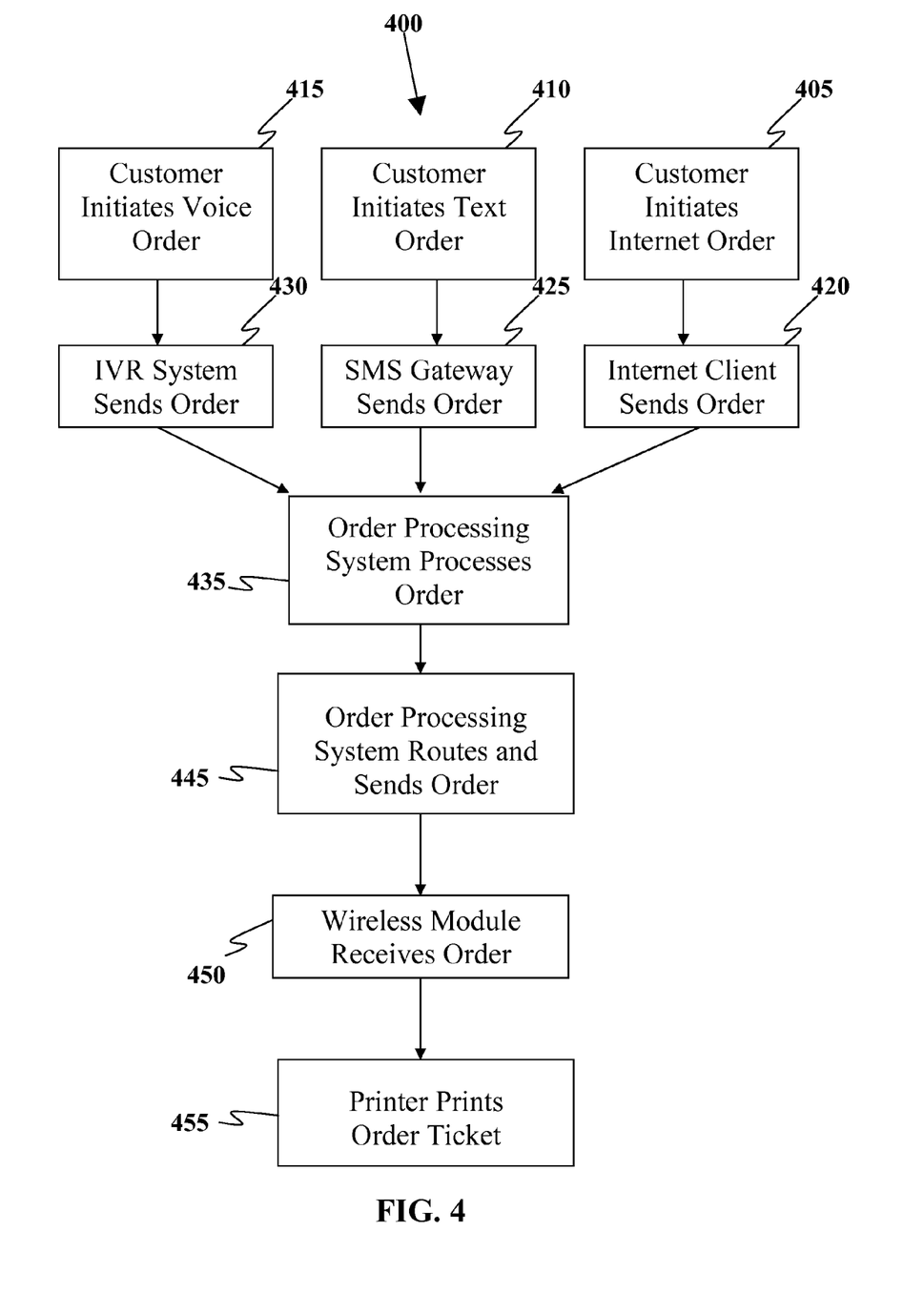
FIG. 4 is a block diagram of a further method for providing remote ordering in accordance with an embodiment of the invention.

FIG. 4 is a block diagram of a further method for providing remote ordering in accordance with an embodiment of the invention. The method for providing remote ordering 400 first comprises the steps where a customer initiates a voice order 415, a customer initiates a text order 410 or a customer initiates an internet order 405. If a customer initiates a voice order 415 then an IVR system sends the order 430 to an order processing system, where the order processing system processes the order 435. If a customer initiates a text order 410, then the SMS gateway sends the order 425 to the order processing system where the order processing system processes the order 435. If a customer initiates an internet order 405, then an internet client sends the order 420 to the order processing system where the order database processes the order 435.

Once the order processing system processes the order 435, the order processing system routes and sends the order 445 to a selected wireless module, where the wireless module receives the order 450. Finally, after the wireless module receives the order 450, the wireless module communicates with a printer and the printer prints an order ticket 455.

As described herein, an order ticket is the product of an order being printed. In one embodiment the order ticket may be in any size or form and on any medium, such as paper, plastic or film. In a further embodiment the order ticket can comprise information including, but not limited to printing time, order due-date, selection of one or more product or service, price of the one or more product or service, customer name, vendor name, customer user-id, customer telephone number, customer address, customer e-mail.

Figure 5:
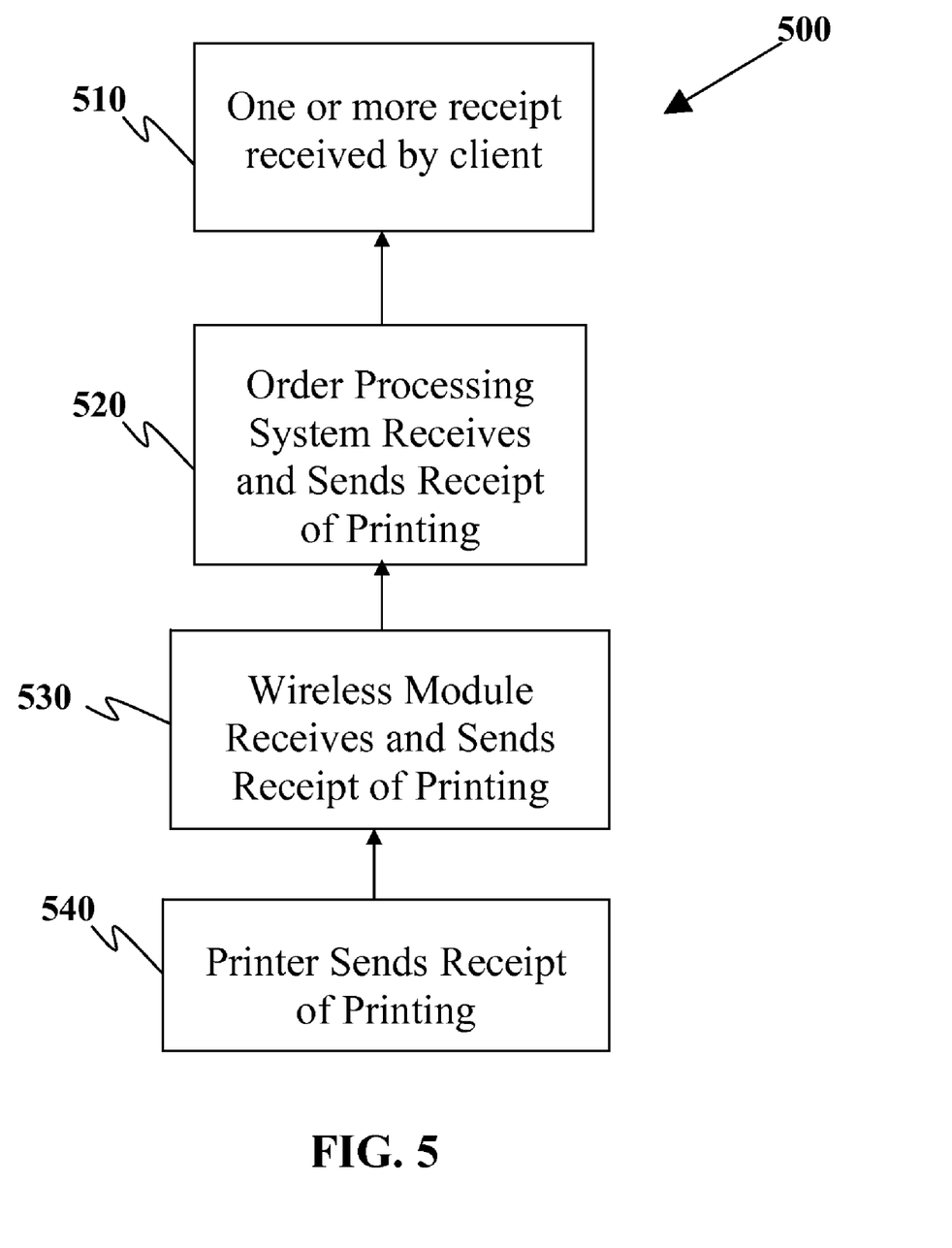
FIG. 5 is a block diagram of a method of generating receipts for remote orders in accordance with an embodiment of the invention.

FIG. 5 is a block diagram of a method of generating receipts for remote orders in accordance with an embodiment of the invention. This method of generating receipts 500 comprises the following steps: printer sends receipt of printing 540; wireless module receives and sends receipt of printing 530; order processing system receives and sends receipt of printing; and one or more receipt received by client 510.

After a printer successfully prints an order ticket the printer sends receipt of printing 540 to a wireless module and the wireless module receives and sends receipt of printing 530. The receipt is sent to an order processing system and the order processing system receives and sends receipt of printing 520. Finally, after the order processing system receives and sends receipt of printing 520, one or more receipt is received by a client 510, which is configured to present the receipt to the a customer.

In a further embodiment of the invention, a client may receive a receipt of any step in a method of providing remote ordering such as wireless module receiving or sending order, wireless database receiving or sending order, order database receiving or sending order, order processing system receiving or sending order, IVR system receiving or sending order, SMS gateway receiving or sending order, internet client receiving or sending order, any client receiving or sending order, confirmation of any type of payment, confirmation of creation of user account, or confirmation of order completion.

Figure 6:
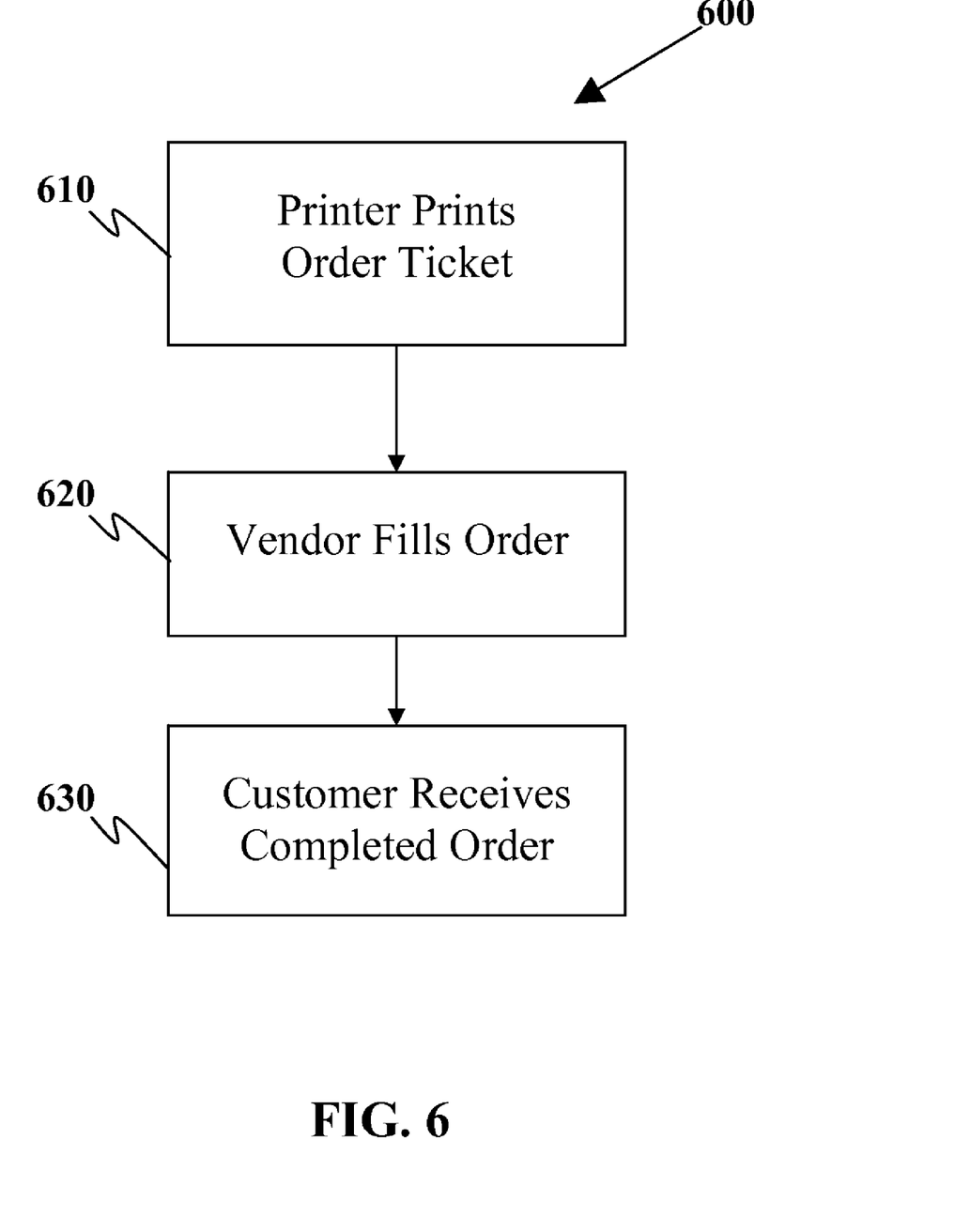
FIG. 6 is a block diagram of a method of filling a remote order, in accordance with an embodiment of the invention.

FIG. 6 is a block diagram of a method of filling a remote order, in accordance with an embodiment of the invention. The method of filling a remote order 600 begins when a printer prints an order ticket 610. A vendor then fills the order 620 and one or more customer receives the completed order 630.

In one embodiment of the invention the printer is located in the place of business of the vendor in a place where the order can be quickly received and filled. For example, if the vendor is a restaurant or food service provider, the printer can be located in the kitchen. In a further embodiment of the invention the printer can be located anywhere in or around the vendor's place of business. In a still further embodiment the first vendor may receive one or more order and communicate with one or more other vendor to fill the one or more order.

In another embodiment of the invention the order can be for any type of product or service, including but not limited to, food, drink, restaurant reservation, a bid, cleaning service, transportation reservation, parking reservation, event ticket, home repair, massage, auto repair, auto maintenance or legal service.

In a still further embodiment, the step where the printer prints and order ticket 610 can be replaced with an order or order ticket being displayed, printed, or presented on any order presentation device. In a yet further embodiment the customer who placed the order or any other person or entity can receive the order. The customer can go directly to the vendor to pick up or receive the product or service, or an agent or representative of the customer may pick up or receive the product or service at the vendors place or business. Additionally, the vendor may send or convey the product or service to the customer or any other agent or assign of the customer or any entity by any means of conveyance or transfer known or unknown.

In yet another embodiment, one or more customer can request a specific pick-up, delivery, or performance method for one or more product of service, including, but not limited to curb-side pickup, home delivery, drive through, mail delivery, or rush delivery. For example, in one embodiment a customer can use an internet client, SMS client or internet client to request curb-side pickup of a product.

In one embodiment, for example, a customer can use a telephone, cellular telephone, satellite telephone, internet-enabled cellular telephone, computer, or personal data assistant or other client to request or select curb-side pickup or other delivery or pick-up method of a product or service. In one embodiment the customer can be alerted or receive an alert that directs the customer to communicate with an order processing system or vendor to alert the vendor that the customer has arrived at or is arriving at the vendor's location or at any other designated location. When a customer communicates with the order processing system or vendor, the vendor can be alerted that the customer has arrived or will arrive at a designated location and the vendor or an agent of the vendor can deliver the product to the customer. For example, the customer can be in or on a vehicle or on foot and the vendor or an agent of a vendor can deliver a product to a customer who is parked at a designated location, at a pick-up window, or has arrived at or will arrive at a given location. The vendor can receive an alert that the customer has arrived or will arrive from an order presentation client or any other client.

In one embodiment, a customer can use an internet client to select or request curb-side pickup of a product and the customer can be instructed to call a designated telephone number when the customer arrives at the vendor's location. The customer can use any type of vehicle or other transportation method to travel to the vendor's location and then call the designated telephone number to alert the vendor that the customer has arrived at the vendor's location. For example, the customer can use an IVR system to communicate with an order processing system and the order processing system can communicate with a wireless module to provide an alert to the vendor that the customer has arrived at the vendor's location. In one example, a customer can pull-up or park a vehicle near a vendor, alert the vendor, and the vendor or an agent of the vendor can deliver a product to the customer in the customer's vehicle. In another embodiment, a customer can send an alert to a vendor by using a SMS client or internet client.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined by reference to the claims that follow.

What is claimed is:

1. A computer system for providing remote ordering, the computer system comprising:
   an order processing computer system operable to:
      obtain user account data comprising:
         at least two product or service favorites defined by a user, and
         a favorite display-order defined by a user;
      obtain a user login;
      present automatically the at least two product or service favorites in an order defined by the favorite display-order; and
      obtain an order comprising:
         at least one product or service favorite in response to a user selecting at least one presented product or service favorite; and
         a vendor selection comprising a specific vendor location selection;
      determine a destination wireless module located at said selected specific vendor location, based on said specific vendor location; and
      communicate said order to said destination wireless module located at said selected specific vendor location; and
   a wireless computer module operable to:
      obtain an order from said order processing system; and
      present said order via an order presentation client.

2. The system of claim 1 wherein said favorite selection can be selected via obtaining one of a letter, and a number.

3. The system of claim 1, wherein said order is obtained from one of an IVR system, and SMS gateway, and an internet client.

4. The system of claim 1, wherein the order presentation client is a printer.

5. The system of claim 1, wherein said wireless module is directly connected with said order presentation client.

6. The system of claim 1, wherein said wireless module is further operable to communicate an order presentation receipt to a client associated with said order.

7. The system of claim 1, wherein said order comprises a pickup time.

8. The system of claim 1 wherein said wireless module is further operable to obtain a customer arrival alert from said order processing system, wherein said customer arrival alert is generated in response to a user arrival indication obtained via a wireless communication channel by said order processing system from a wireless user device that sent said order, the wireless user device being remote from said order processing system when the user arrival indication is initiated at the wireless user device.

9. The system of claim 8, further comprising said wireless module presenting said customer arrival alert via said order presentation client.

10. The method system of claim 1, wherein said specific vendor location is defined by a street address.

11. A computer implemented method for providing remote ordering, the method comprising:
   a computer obtaining user profile data comprising:
      a plurality of user-defined favorites; and
      favorite display-order data defined by a user,
   the computer presenting at least some of the user-defined favorites based on the favorite display-order data;
   the computer obtaining an order comprising:
      order data including at least one user-defined favorite; and
      vendor selection data including a specific vendor location;
   the computer determining a destination wireless module based on said vendor selection data;
   the computer communicating said order to said destination wireless module via a wireless network and said wireless module presenting said order via an order presentation client.

12. The method of claim 11 wherein said wireless module is directly connected with said order presentation client.

13. The method of claim 11, wherein said presenting comprises printing said order.

14. The method of claim 11, wherein said order is obtained from one of an IVR system, and SMS gateway, and an internet client.

15. The method of claim 11, further comprising said wireless module communicating an order presentation receipt to a client associated with said order.

16. The method of claim 11, wherein said order data comprises a pickup time.

17. The method of claim 11, wherein said order data comprises one of delivery method and pickup method, wherein pickup method options consist of in-store pickup and vehicle pickup.

18. The method of claim 11 further comprising said wireless module receiving a customer arrival alert via a wireless communication channel, wherein said arrival alert is triggered by a customer via a wireless user device that sent said order, the wireless user device being remote from said wireless module when said arrival alert is triggered.

19. The method of claim 18 further comprising said wireless module presenting said customer arrival alert via said order presentation client.

* * * * *